United States Patent [19]

Poetsch et al.

[11] Patent Number: 5,456,860

[45] Date of Patent: * Oct. 10, 1995

[54] MATRIX LIQUID-CRYSTAL DISPLAY

[75] Inventors: Eike Poetsch, Mühtal; Ulrich Finkenzeller, Plankstadt; Reinhard Hittich, Modautal, all of Germany

[73] Assignee: Merck Patent Gesellschaft Mit Beschrankter Haftung, Darmstadt, Germany

[*] Notice: The portion of the term of this patent subsequent to Feb. 15, 2011 has been disclaimed.

[21] Appl. No.: 990,832

[22] Filed: Dec. 14, 1992

Related U.S. Application Data

[63] Continuation-in-part of Ser. No. 677,891, Apr. 1, 1991, abandoned.

[30] Foreign Application Priority Data

Mar. 31, 1990 [DE] Germany ............ 40 10 447.8

[51] Int. Cl.⁶ .................... C09K 19/30; C09K 19/12; G02F 1/13
[52] U.S. Cl. .................. 252/299.63; 252/299.66; 359/103
[58] Field of Search ............. 252/299.63, 299.66; 359/103

[56] References Cited

U.S. PATENT DOCUMENTS

| | | | |
|---|---|---|---|
| 4,505,837 | 3/1985 | Römer et al. | 252/299.6 |
| 4,547,309 | 10/1985 | Mochizuki et al. | 252/299.63 |
| 4,582,395 | 4/1986 | Morozumi | 359/57 X |
| 4,589,733 | 5/1986 | Yaniv et al. | 359/57 X |
| 4,704,002 | 11/1987 | Kikuchi et al. | 359/59 X |
| 4,710,315 | 12/1987 | Schad et al. | 252/299.63 |
| 4,724,097 | 2/1988 | Römer et al. | 252/299.63 |
| 4,740,782 | 4/1988 | Aoki et al. | 345/92 X |
| 4,770,498 | 9/1988 | Aoki et al. | 359/59 X |
| 4,770,503 | 9/1988 | Buchecker et al. | 359/103 X |
| 4,797,228 | 1/1989 | Goto et al. | 252/299.63 |
| 4,871,234 | 10/1989 | Suzuki | 359/58 X |
| 4,871,469 | 10/1989 | Reiffenrath et al. | 252/299.61 |
| 4,871,470 | 10/1989 | Wächtler et al. | 252/299.63 |
| 4,917,819 | 4/1990 | Goto et al. | 252/299.63 |
| 4,980,486 | 12/1990 | Petrzilka et al. | 349/373 |
| 5,032,313 | 7/1991 | Goto et al. | 252/299.63 |
| 5,064,567 | 11/1991 | Funada et al. | 252/299.61 |
| 5,122,295 | 6/1992 | Weber et al. | 252/299.01 |
| 5,178,790 | 1/1993 | Weber et al. | 252/299.01 |
| 5,213,710 | 5/1993 | Reiffenrath et al. | 252/299.63 |
| 5,286,411 | 2/1994 | Rieger et al. | 252/299.63 |
| 5,308,542 | 5/1994 | Poetsch et al. | 252/299.63 |

FOREIGN PATENT DOCUMENTS

| | | |
|---|---|---|
| 3006666 | 9/1991 | Germany . |
| 59-82323 | 5/1984 | Japan . |
| 88/08441 | 11/1988 | WIPO . |
| 89/09252 | 10/1989 | WIPO . |
| 90/01056 | 2/1990 | WIPO . |

*Primary Examiner*—Cynthia Harris
*Attorney, Agent, or Firm*—Millen, White, Zelano & Branigan

[57] ABSTRACT

The invention relates to a matrix liquid-crystal display (MLCD) containing a liquid-crystal mixture based on dielectrically positive liquid-crystal compounds which have a polar end group with a lipophilicity parameter, $\bar{\pi}$, value of $\geq 0.1$.

4 Claims, No Drawings

MATRIX LIQUID-CRYSTAL DISPLAY

CROSS REFERENCE TO RELATED APPLICATION

This application is a continuation-in-part of application Ser. No. 07/677,891, filed Apr. 1, 1991 abandoned.

SUMMARY OF THE INVENTION

The invention relates to a matrix liquid-crystal (MLC) display containing two plane-parallel outer plates which, together with a frame, form a cell, integrated nonlinear elements for switching individual pixels on the outer plates, and a nematic liquid-crystal mixture of positive dielectric anisotropy located in the cell.

Examples of nonlinear elements which can be used for individual switching of individual pixels are active elements (i.e., transistors). One then refers to an "active matrix", where a differentiation can be made between two types:

1. MOS (Metal Oxide Semiconductor) transistors on silicon wafers as the substrate,
2. Thin-film transistors (TFT) on a glass plate as the substrate.

In type 1, the electrooptical effect used is usually dynamic scattering or the guest-host effect. The use of monocrystalline silicon as the substrate material limits the display size, since the modular composition of various part-displays results in problems at the joins.

In the more promising type 2, which is preferred, the electrooptical effect used is usually the TN (twisted nematic) effect. A differentiation is made between two technologies: TFTs comprising compound semiconductors, such as, for example CdSe, or TFTs based on polycrystalline or amorphous silicon.

The latter technology is being worked on with great vigor worldwide. The TFT matrix is applied to the inside of one glass plate of the display, while the inside of the other glass plate carries the transparent counterelectrode. Compared with the size of the pixel electrode, the TFT is very small and hardly affects the image at all. This technology can also be extended to fully color-capable image displays, in which a mosaic of red, green and blue filters is arranged in such a manner that each filter element is located opposite a switchable pixel.

The electrode coatings are coated with alignment layers, which are based, inter alia, on polymer coatings, such as, for example, polyimide coatings or polyvinyl alcohol coatings, which are provided with a uniform alignment by rubbing, if necessary with simultaneous application of pressure. In addition, alignment layers can also be obtained by vapor-deposition of inorganic materials, such as, for example, silicon oxide or magnesium fluoride. A review of the various alignment techniques is given in, for example, Thermotropic Liquid Crystals, G. W. Gray [ed.], p. 75–77.

The TFT displays are usually based on the TN principle, so that the liquid-crystal molecules have a parallel edge alignment, usually at a small pretilt angle in the order of, for example, 1°–10°. However, it is also possible for the TFT displays to operate as ECB (electrically controlled birefringence) or STN (super twisted nematic) cells or alternatively to be based on other principles, such as, for example, the guest host principle.

The term MLC display is broad and covers any matrix display containing integrated nonlinear elements, i.e., in addition to the active matrix, also displays containing passive elements, such as, for example, varistors or diodes (MIM=metal-isolator-metal) and also other types of display.

MLC displays are particularly suitable, for example, for TV and computer applications or for high-information displays in automobile or aircraft construction. In addition to problems with respect to the angle dependency of the contrast (Katayama, M. et al., Proceedings SID Conference, Anaheim, May 1988, p. 312, Inoue, F. et al., ibid., p. 318, Niki, K., ibid., p. 322) and excessively long switching times, particular problems arise in MLC displays due to the inadequately high specific resistance of liquid-crystal mixtures (Togashi, S., et al., Proceedings Eurodisplay 84, Paris, September 1984, p. 141; Stromer, M., ibid., p. 145; Barm, Y., et al., Proceedings Japan Display, Tokyo, September 1986, p. 68; Vijan, M., Proceedings SID Conference, New Orleans May 1987, p. 159; Blinov, L. M., Electrooptical and Magneto-optical Properties of Liquid Crystals, Wiley, 1983, chapter 5). The contrast of MLC displays drops with the specific resistance.

The specific resistance of a liquid-crystal within an MLC display is affected by the degree of purity of the internal surfaces of the display, the purity and polymerization process of the organic polymer used as the alignment layer playing an important part.

However, the properties of the liquid-crystal itself are of crucial importance, and it has therefore already been attempted to find correlations between the specific resistance and other parameters of the liquid crystal. Thus, for example, G. Weber et al., Liquid Crystals, 5 (1989) 1381, discuss the mean dielectric constant $\bar{\epsilon}$ according to (1)

$$\bar{\epsilon}=(2\epsilon_\perp+\epsilon_\parallel)/3 \qquad (1)$$

where $\epsilon_{81}$ and $\epsilon_{195}$ denote the dielectric constants of the liquid crystal parallel and perpendicular, respectively, to the director of the liquid-crystal molecules, as a measure of the specific resistance of the liquid crystal. It is deduced from the correlation found that polar mixtures, inter alia, have a lower specific resistance than non-polar mixtures, and that $\epsilon$ should be kept as low as possible. However, this correlation is not general and, in addition, due to its qualitative character, is not a technical teaching on the conception of liquid-crystal mixtures.

In addition to inadequate specific resistance, the MLCDs hitherto and the liquid-crystal mixtures present therein frequently have an inadequate operating temperature range, excessively long switching times, an excessively high threshold voltage and inadequate UV and temperature stability.

An object of the invention is to provide MLCDS which do not have the abovementioned disadvantages or only do so to a small extent, and simultaneously have very high specific resistance.

Upon further study of the specification and appended claims, further objects and advantages of this invention will become apparent to those skilled in the art.

It has now been found that these objects can be achieved by the provision of the MLCDs according to the invention.

The invention thus relates to an MLCD containing two plane-parallel outer plates which, together with a frame, form a cell, integrated nonlinear elements for switching individual pixels on the outer plates, and a nematic liquid-crystal mixture of positive dielectric anisotropy located in the cell,
characterized in that the liquid-crystal mixture is based on dielectrically positive liquid-crystal compounds which contain a polar end group of the formula I

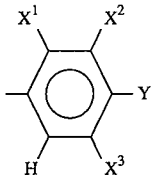

in which

Y is —NCS, —F, —Cl, —CZ$_l$H$_{3-l}$ or —OCZ$_l$H$_{3-l}$,

X$^1$, X$^2$ and X$^3$, independently of one another, are H or F,

Z is Cl or F, and l is 1, 2 or 3, the lipophilicity parameter related to the end groups having a value $\bar{\pi} \geq 0.1$.

The invention furthermore relates to appropriate liquid-crystalline mixtures, in particular for use in MLCDs. However, the mixtures are also suitable for many other applications, such as, for example, TN, STN or OMI (optical mode interference).

T. Fujita et al., J. Amer. Chem. Soc., 86 (1964) 5175, define the lipophilicity parameter of a substituted compound X, which may be regarded as a derivative of an unsubstituted compound, as $$\pi = \log P_X - \log P_H \quad (2)$$

where $P_X$ is the distribution quotient of the derivative, and $P_H$ is that of the unsubstituted compound in the octan-1-ol/ water system.

In the context of the present invention, a further lipophilicity term $\bar{\pi}$ $$\bar{\pi} = \log P_{I^*} - \log P_B \quad (3)$$

where $P_{I^*}$ is the distribution quotient of I*

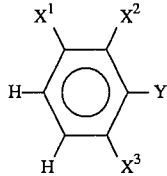

and $P_B$ is that of unsubstituted benzene, and X$^1$, X$^2$, X$^3$ and Y are as defined above, obtained by modifying (2) is used in addition to $\pi$.

$\bar{\pi}$ is accordingly a measure of the lipophilicity of the polar end group I, while $\pi$ characterizes the lipophilicity of the liquid-crystal compound containing the polar end group I. $\bar{\pi}$ can be easily and reliably determined, and corresponding values can frequently be obtained from the literature. By contrast, $\pi$ is significantly more complex to determine analytically in accordance with (2) from the distribution quotients of the liquid-crystal compounds containing an end group of the formula I and the corresponding unsubstituted parent compounds.

Generally, the dielectrically positive liquid-crystal compound containing a polar end group of formula I is a compound containing at least two ring structures wherein the ring structures are connected together by direct bonds or conventional linkage groups, the rings optionally containing conventional lateral substituents and the terminal rings containing conventional terminal wing groups, wherein the compound is capable of exhibiting a liquid crystalline phase. See, for example, the disclosures of DE 39 29 525.7 (filed Sep. 6, 1990) and and its corresponding PCT application WO 90-01471; DE 39 29 526.5 (filed Sep. 7, 1990); DE 40 09 907.5 (filed Mar. 28, 1990); PCT/EP 90/01471 (filed Sep. 3, 1990) and its corresponding U.S. application Ser. No. 07/623,385, filed Nov. 19, 1990; EP 90105554.1 (filed Mar. 23, 1990) and its corresponding U.S. application Ser. No. 07/673,907; DE 4013241.2 (filed Apr. 26, 1990) and its corresponding U.S. application Ser. No. 07/691,275 (now U.S. Pat. No. 5,122,297); DE 4012403.7 (filed Apr. 19, 1990 ) and its corresponding U.S. application Ser. No. 07/688, 125; and DE 40 00 535.6 (filed Jan. 10, 1990).

If it is assumed that the lipophilicity parameter of a molecule is composed additively of the lipophilicity parameters of the sub-structures of the molecule, $\pi$ and $\bar{\pi}$ should be identical. In fact, however, a certain deviation is observed, whose extent, however, is generally small and, in particular for liquid-crystal compounds of the formula A

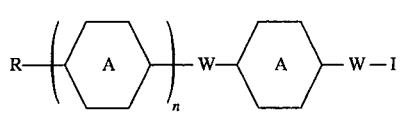

A in which

R is an alkyl group having 1–15 carbon atoms, in which, in addition, one or more non-adjacent CH$_2$ groups may be replaced by —O—, —CO—, —COO— or —CH=CH—,

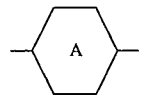

is in each case, independently of one another, 1,4-cyclohexylene, laterally unsubstituted or 5-mono- and/ or 2,3-di-F-substituted 1,4-phenylene, dioxane-2,5-diyl, tetrahydropyran-2,5-diyl, pyridine-2,5-diyl or 1,4-cyclohexenylene, W is a single bond or —CH$_2$CH$_2$—, n is 1 or 2, and I is the abovementioned polar end group, is low and/or negligible, so that the values for $\bar{\pi}$ can be used to characterize the lipophilic properties of compounds of the formula A.

It has now been found that liquid-crystal compounds which contain a polar end group of the formula I having a lipophilicity parameter $\bar{\pi} \geq 0.1$ and/or are given by the formula A and have a polar end group of the formula I having a lipophilicity parameter $\bar{\pi} \geq 0.1$ are particularly suitable as components of liquid-crystal mixtures, and have, in particular, high values for the specific resistance ρ. Very particularly suitable compounds are those for which $\pi$ or $\bar{\pi} \geq 0.3$ and in particular $\pi$ or $\bar{\pi} \geq 0.5$. Furthermore, particularly preferred compounds are those of the formula A in which

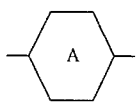

is in each case, independently of one another, 1,4-cyclohexylene, or 1,4-phenylene which is laterally unsubstituted or monosubstituted or disubstituted by F in the 2,3- and/or 5-position.

Table 1 gives the hydrophilicity parameter $\tilde{\pi}$ for some liquid-crystal compounds containing the polar end group II

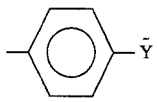

II in which $\tilde{Y}$ is —CN, —CF$_3$, —N=C=S, —OCHF$_2$, —OCF$_3$, —Cl, —F, —CH$_3$ or —CH$_2$OH, the dipole moment of the corresponding benzene derivative IIa

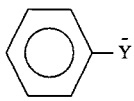

IIa and the dielectric constant $\Delta\epsilon$ of the liquid-crystalline model compound

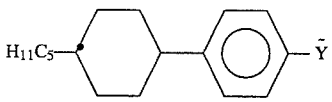

IIb

Table 1 shows that polar end groups of the formula Ia

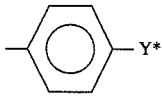

Ia in which

Y* is —CF$_3$, —NCS, —OCHF$_2$, —OCF$_3$, —Cl or —F, have a lipophilicity parameter $\tilde{\pi}\geq 0.1$ and that compounds of the formula A which contain a polar end group of the formula Ia are therefore particularly suitable as a component of liquid-crystal mixtures for MLCDs. Very particular preference is given to liquid-crystal compounds containing end groups of the formulae Ia1 and Ia2

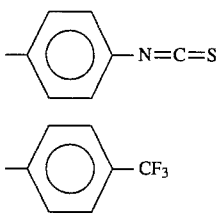

Ia1

Ia2 which are characterized by a high lipophilicity parameter and simultaneously a high dielectric constant, as can be concluded from the high dipole moments μ of the corresponding benzene derivatives IIa or the high dielectric constants of the corresponding compounds of the formula IIb. These compounds have, on the one hand, high values for the specific resistance, and, on the other hand, mixtures which contain these compounds or are based thereon are characterized by comparatively short switching times and low threshold voltages.

It can furthermore be seen from Table 1 that liquid-crystal compounds which contain an end group of the formulae Ia3–Ia6

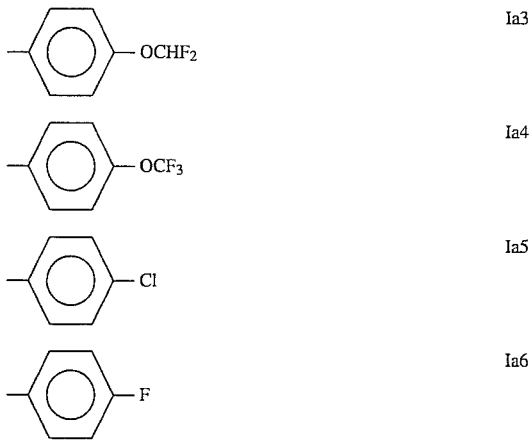

Ia3

Ia4

Ia5

Ia6 are particularly suitable as components of liquid-crystal mixtures for MLCDs; very particularly suitable liquid-crystal compounds are those containing end groups of the formulae Ia3–Ia5, and in particular those containing end groups of the formula Ia3 or Ia4.

Although liquid-crystal compounds which contain an end group of the formulae Ia7

Ia7 have a lipophilicity parameter $\tilde{\pi}$=0.56, these compounds are, however, at the same time dielectrically neutral, so that liquid-crystal mixtures containing such compounds in an excessive proportion by weight of, for example, more than 20% by weight are characterized by excessively long switching times and excessively high threshold voltages.

Table 1 also shows that liquid-crystal compounds containing an end group of the formula Ia8 or Ia9

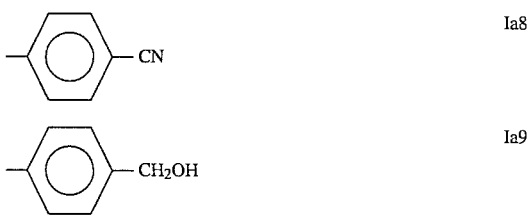

Ia8

Ia9 are characterized by a negative lipophilicity parameter $\tilde{\pi}$ and are therefore not suitable as components of liquid-crystal mixtures for MCLDs. The example of compounds of the formula Ia9 again shows clearly that the correlation given in the prior art between the specific resistance and the dielectric constant $\Delta\epsilon$ is not valid in general terms and is not suitable as a criterion for developing mixtures for MLDCs. Liquid-crystal compounds containing an end group of the formula Ia9 have a mean dielectric constant $\Delta\epsilon$ which can be derived from the dipole value of the corresponding benzene derivative of the formula IIa, so that liquid-crystal mixtures containing such compounds should have a high specific resistance according to the relation given in the prior art, but this is not the case.

It has furthermore been found that the polar end groups of the formulae I1–I23 given in Table 2 are characterized by lipophilicity parameters $\pi \geq 0.1$, and that, in particular, liquid-crystal compounds of the formula A which contain a polar end group of the formula I1–I23 are particularly suitable for liquid-crystal mixtures for MLCDs.

Analogously to the laterally unsubstituted end groups of the formula Ia, the laterally substituted isothiocyanato end groups of the formulae I1 and I2, the laterally substituted $CF_3$ end group of the formula I7 and the laterally substituted $OCF_3$ end groups of the formulae I12 and I13 also have particularly high values for the lipophilicity parameter $\pi$, and the compounds of the formula A containing these end groups have very particularly favorable properties for MLCDs and in particular a high specific resistance. The substitution in the 3- and/or 5-position greatly increases the dielectric anisotropy of the compounds, which results in a low threshold voltage and shorter switching times compared with the corresponding unsubstituted compounds; in addition, the lateral substitution in the 2,3- and/or 5-position favorably affects the flow viscosity.

Like the laterally unsubstituted end groups of the formula Ia1–Ia6, the laterally substituted Cl end groups are clearly superior to the laterally substituted F end groups with respect to their suitability for MLC displays, so that, in particular, end groups of the formulae I5, I6, I8–I11, I14–I17 and I20–I23 are preferred. Compounds of the formula A which contain these end groups are characterized, in particular, by high values for the specific resistance and, in addition, by high temperature and UV stability, a high dielectric constant $\Delta\epsilon$ and favorable values for the flow viscosity. Very particular preference is given to compounds of the formula A which contain an end group of the formula I5, I6, I8, I14–I17, I20 or I21.

Although the laterally substituted —$OCHF_2$ end groups of the formulae I18 and I19 generally have lower values for $\pi$ than laterally substituted Cl end groups, this difference is, however, usually not very great, so that the $OCHF_2$ end groups are also particularly suitable for MLCDs; very particularly favorable properties are exhibited by compounds of the formula A which contain an end group of the formula I18.

The following smaller group of compounds of the formulae A1-10 is very particularly suitable:

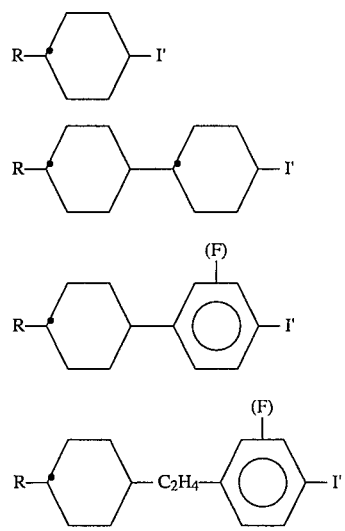

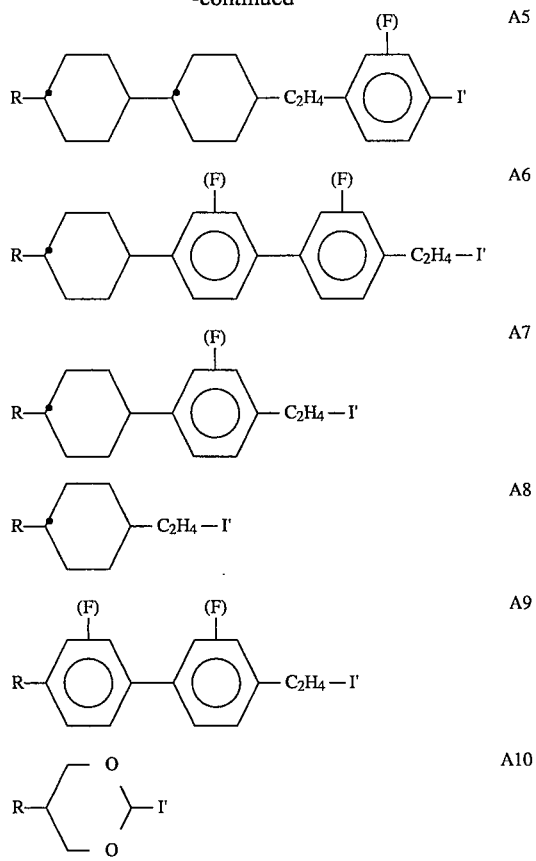

in which

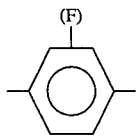

is a 1,4-phenylene group which is unsubstituted or monosubstituted by F in the 2- or 3-position, and I' is a polar end group selected from the end groups of the formula Ia1–Ia6 and I1–I23, and R is as defined above.

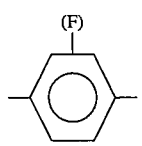

is, in particular, an unsubstituted or 3-substituted 1,4-phenylene group; the tetracyclic compounds of the formulae A5 and A6 preferably have at least one 3-fluorinated 1,4-phenylene group. The polar end groups Ia1–Ia4, I1–I9 and I12–I21 are preferred; the end groups I1–I9 and I12–I21 are very particularly advantageous. R is, in particular, alkyl, alkoxy, alkoxy-alkyl or alkenyl having 1–10 carbon atoms and very particularly having 1–8 carbon atoms. R is very particularly preferably methyl, ethyl, propyl, butyl, pentyl, hexyl, heptyl, octyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl, propoxyethyl, pent-2-enyl, pent-3-enyl, pent-4-enyl, hex-2-enyl, hex-3-enyl, hex-4-enyl or hex-5-enyl.

The compounds of the formula A and in particular of the formulae A1–A10 are either known and/or are prepared by methods which are known per se, as described, for example, in the literature (for example in the standard works of Houben-Weyl, Methoden der organischen Chemie, Georg-Thieme-Verlag, Stuttgart, Volume IX, pp. 867 ff.), to be precise under reaction conditions which are known and suitable for said reactions. Use may also be made hereof variants which are known per se, but are not described in greater detail.

The liquid-crystal mixtures used in the MLCDs according to the invention are based, in particular, on compounds of the formula A which contain a polar end group having a lipophilicity parameter $\bar{\pi} \geq 0.1$ and in particular on the compounds of the formulae A1–A10 where $\bar{\pi} \geq 0.1$. The proportion by weight of the liquid-crystal compounds containing a polar end group of formula I, or compounds of the formula A and in particular of the formulae A1–A10 where $\bar{\pi} \geq 0.1$ in the liquid-crystal mixture according to the invention is preferably 20%–100%, in particular 30%–100% and very particularly 38%–100%. The liquid-crystal mixtures preferably contain 1–25, in particular 2–13 and very particularly more than 2, compounds of the formula A and particularly of the formulae A1–A10 where $\bar{\pi} \geq 0.1$.

Also preferred are liquid mixtures containing more than 40% of compounds exhibiting a polar end group of formula I4, for example, 50%, 60%, 63%, 67%, 83% and 90% of such compounds.

Very particular preference is given to a smaller group of base mixtures, which are based on the compounds of the formulae A1–A10 where $\bar{\pi} \geq 0.1$ given in Table 3. The table gives the proportion by weight range in which the liquid-crystal compounds used in these base mixtures occur in the liquid-crystal mixtures according to the invention. The sum of the proportions by weight of the compounds present in the base mixtures as a proportion of the liquid-crystal mixtures according to the invention is from 15%–95% and in particular 25%–95% and very particularly 35%–95%. The liquid-crystal mixtures according to the invention which are based on the base mixtures are obtained by adding further compounds to the base mixtures in the permitted percentage by weight ranges. These additional compounds are selected, in particular, from the group comprising the compounds of the formula A where $\bar{\pi} \geq 0.1$.

It goes without saying that further compounds may also be added, if desired, to the base mixtures, inter alia, in particular, dielectrically neutral compounds which contain a non-polar end group where $\bar{\pi} \geq 0.1$. Non-bridged compounds of the formulae Z1–Z6

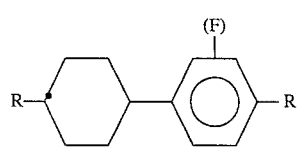

Z1

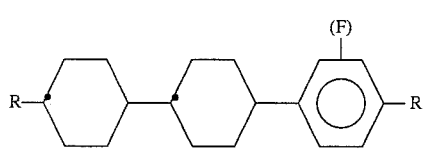

Z2

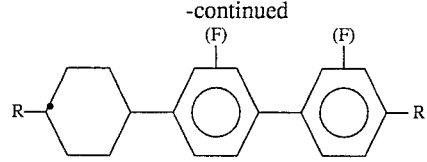

Z3

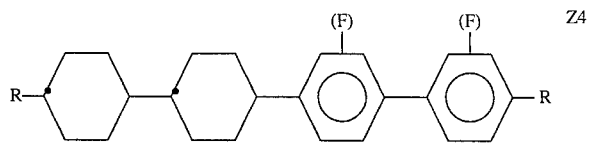

Z4

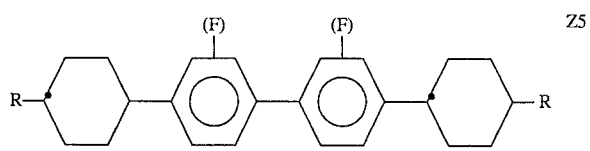

Z5

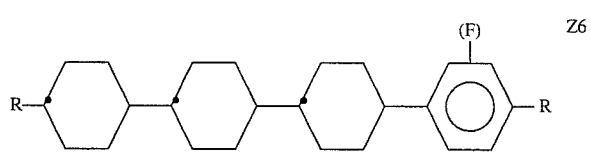

Z6 in which R and

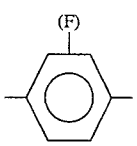

(F)

of the formulae are as defined above, are very particularly suitable.

Particular preference is given to the addition to the mixtures according to the invention of dielectrically neutral or dielectrically positive compounds of the formulae Z7–Z8

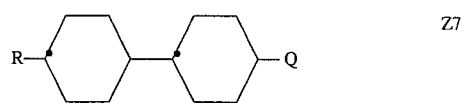

Z7

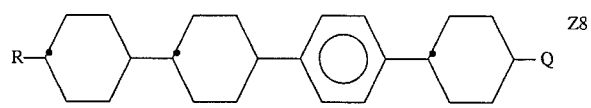

Z8 in which Q is R, Y* or R'-Y*, R' is alkyl, alkoxy, alkoxyalkyl or alkenyl having 1–5 carbon atoms, and R and Y* are as defined above. $\bar{\pi}$ cannot be used to characterize the lipophilicity of compounds Z7 and Z8. A further lipophilicity parameter $\tilde{\pi}$ is defined in accordance with $$\tilde{\pi} = \log P_{III} - \log P_{CH}$$

in which $P_{III}$ is the distribution quotient of III

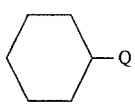

III and $P_{CH}$ is that of unsubstitued cyclohexane in the octan-1-ol/water system, so that those compounds of the formula Z7 and Z8 whose end group has a lipophilicity parameter $\tilde{\pi} \geq 0.1$ are very particularly preferred However, the proportion by weight of dielectrically neutral compounds is preferably not too high, due to the adverse effect on the threshold voltage and switching time, and is, in particular, less than 30% and very particularly less than 20%.

It is also possible to add further compounds which are not explicitly mentioned here. In many cases, however, this results in less favorable properties. However, a person skilled in the art can easily determine whether and, if so, in what amounts further compounds can be used.

The liquid-crystal mixtures according to the invention are prepared in a manner which conventional per se. In general, the desired amount of the component used in the lower amount is dissolved in the component making up the principal constituent, expediently at elevated temperature. It is also possible to mix solutions of the components in an organic solvent, for example in acetone, chloroform or methanol, and, after mixing, to remove the solvent again, for example by distillation.

The liquid-crystal mixtures according to the invention may also contain further additives which are known to a person skilled in the art and are described in the literature. For example, 0–15% of pleochroic dyes or chiral dopes may be added.

The liquid-crystal mixtures according to the invention may be modified for the particular application by means of additives of this type or by adding further compounds, such as, for example, those of the formulae Z1–Z4 or other compounds, and, for example, optimally matched to the driver electronics. However, it is crucial that liquid-crystal mixtures containing a polar group of the formula I having a lipophilicity parameter $\pi \geq 0.1$ based on the end group and/or based on compounds of the formula A and in particular of the formulae A1–A10 which contain polar end groups having $\pi \geq 0.1$, are particularly suitable for use in MLC displays according to the invention. However, very particularly suitable liquid-crystal mixtures are those which are based on the base mixtures given in Table 3 and contain compounds of the formulae A1–A10 in the defined percentage by weight ranges.

TABLE 2

Laterally substituted polar end groups where $\pi \geq 0.1$

| Designation | $X^1$ | $X^2$ | $X^3$ | Y |
|---|---|---|---|---|
| I1 | H | H | F | NCS |
| I2 | H | F | F | NCS |
| I3 | H | H | F | F |
| I4 | H | F | F | F |
| I5 | H | H | F | Cl |
| I6 | H | F | F | Cl |
| I7 | H | H | F | $CF_3$ |
| I8 | H | H | F | $CFCl_2$ |
| I9 | H | H | F | $CCl_2H$ |
| I10 | H | H | F | $CCl_3$ |
| I11 | H | F | F | $CCl_3$ |
| I12 | H | H | F | $OCF_3$ |
| I13 | H | F | F | $OCF_3$ |
| I14 | H | H | F | $OCF_2Cl$ |
| I15 | H | F | F | $OCF_2Cl$ |
| I16 | H | H | F | $OCFCl_2$ |
| I17 | H | F | F | $OCFCl_2$ |
| I18 | H | H | F | $OCF_2H$ |
| I19 | H | F | F | $OCF_2H$ |
| I20 | H | H | F | $OCCl_2H$ |
| I21 | H | F | F | $OCCl_2H$ |
| I22 | H | H | F | $OCCl_3$ |
| I23 | H | F | F | $OCCl_3$ |

TABLE 3

Preferred base mixtures

| Base mixture | Compounds | Percentage by weight range |
|---|---|---|
| BM 1 | A1 | 15–65 |
|  | A3 | 5–45 |
| BM 2 | A1 | 13–70 |
|  | A4 | 5–48 |
| BM 3 | A1 | 17–69 |
|  | A5 | 3–40 |
| BM 4 | A1 | 15–67 |
|  | A6 | 3–39 |
| BM 5 | A1 | 14–73 |
|  | A7 | 3–40 |
| BM 6 | A1 | 15–68 |
|  | A9 | 5–35 |
| BM 7 | A2 | 10–59 |

TABLE 1

Lipophilicity parameter $\pi$ of some laterally unsubstituted end groups

| Terminal substituent Y | Hydrophilicity parameter $\pi$ of phenyl-Y | Dipole moment $\mu$ of phenyl-Y [$10^{-18}$ esu·cm] | Dielectric constant $\Delta\epsilon$ of $C_5H_{11}$-cyclohexyl-phenyl-Y |
|---|---|---|---|
| CN | −0.57 | 3.90 | 13 |
| $CF_3$ | 0.88 | 2.56 | 11 |
| N=C=S | 1.15 | 2.9 | 10.8 |
| $OCF_2H$ | 0.58 | 2.46 | 7.6 |
| $OCF_3$ | 1.04 | — | 7.1 |
| Cl | 0.71 | 1.58 | — |
| F | 0.14 | 1.46 | 3.2 |
| $CH_3$ | 0.56 | 0.4 | 0.2 |
| $CH_2OH$ | −1.03 | 1.68 |  |

TABLE 3-continued

Preferred base mixtures

| Base mixture | Compounds | Percentage by weight range |
|---|---|---|
|  | A3 | 5–45 |
| BM 8 | A2 | 13–72 |
|  | A4 | 7–38 |
| BM 9 | A2 | 11–69 |
|  | A5 | 3–42 |
| BM 10 | A2 | 10–58 |
|  | A6 | 7–49 |
| BM 11 | A2 | 8–65 |
|  | A7 | 3–38 |
| BM 12 | A2 | 15–70 |
|  | A10 | 5–45 |
| BM 13 | A8 | 12–73 |
|  | A3 | 5–50 |
| BM 14 | A8 | 8–67 |
|  | A4 | 3–35 |
| BM 15 | A8 | 9–63 |
|  | A6 | 5–40 |
| BM 16 | A8 | 10–60 |
|  | A5 | 3–4 |
| BM 17 | A8 | 12–68 |
|  | A9 | 3–40 |
| BM 18 | A8 | 9–71 |
|  | A10 | 3–44 |
| BM 19 | A1 | 15–50 |
|  | A2 | 5–45 |
|  | A3 | 2–35 |
| BM 20 | A1 | 13–51 |
|  | A2 | 4–43 |
|  | A5 | 1–34 |
| BM 21 | A1 | 10–50 |
|  | A2 | 5–47 |
|  | A6 | 2–35 |
| BM 22 | A1 | 11–51 |
|  | A2 | 3–40 |
|  | A7 | 2–30 |
| BM 23 | A1 | 13–42 |
|  | A2 | 6–41 |
|  | A9 | 1–25 |
| BM 24 | A1 | 10–45 |
|  | A2 | 5–40 |
|  | A3 | 1–30 |
|  | A5 | 1–25 |
| BM 25 | A1 | 9–53 |
|  | A2 | 4–38 |
|  | A3 | 1–22 |
|  | A6 | 1–17 |
| BM 26 | A8 | 17–51 |
|  | A2 | 4–45 |
|  | A3 | 3–39 |
| BM 27 | A8 | 9–48 |
|  | A2 | 7–41 |
|  | A4 | 1–29 |
| BM 28 | A8 | 12–48 |
|  | A2 | 4–40 |
|  | A5 | 1–38 |
| BM 29 | A8 | 11–53 |
|  | A2 | 5–45 |
|  | A6 | 1–25 |
| BM 30 | A8 | 15–45 |
|  | A2 | 3–42 |
|  | A7 | 2–29 |
| BM 31 | A8 | 13–43 |
|  | A2 | 2–39 |
|  | A9 | 3–35 |
| BM 32 | A10 | 14–45 |
|  | A2 | 6–40 |
|  | A3 | 2–35 |
| BM 33 | A10 | 10–49 |
|  | A2 | 5–45 |
|  | A4 | 4–28 |
| BM 34 | A10 | 14–53 |
|  | A2 | 4–39 |
|  | A5 | 3–39 |
| BM 35 | A10 | 14–53 |
|  | A2 | 3–45 |
|  | A6 | 2–40 |
| BM 36 | A10 | 12–48 |
|  | A2 | 3–40 |
|  | A7 | 1–33 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Federal Republic of Germany P 40 10 447.8, filed Mar. 31, 1990, are hereby incorporated by reference.

EXAMPLES

The examples given below are intended to illustrate the invention without representing a limitation. mp.=melting point, cp.=clear point, η=viscosity (20° C.), Δn=optical anisotropy (20° C., 589 nm), Δε=dielectrical anisotropy (20° C., 1 kHz). Above and below, percentages are percent by weight; all temperatures are indicated in degrees Celsius.

Example 1

A matrix liquid crystal display of the TFT type containing a nematic liquic crystal mixture consisting of 10.0% of 4-(trans-4-propylcyclohexyl)-1-chlorobenzene
8.0% of 4-(trans-4-pentylcyclohexyl)-1-chlorobenzene
6.0% of 4-(trans-4-heptylcyclohexyl)-1-chlorobenzene
8.0% of 4-[trans-4-(trans-4-ethylcyclohexyl)-cyclohexyl]-1-trifluoromethoxybenzene
10.0% of 4-[trans-4-(trans-4-propylcyclohexyl)-cyclohexyl]-1-trifluoromethoxybenzene
7.0% of 4-[trans-4-(trans-4-butylcyclohexyl)-cyclohexyl]-1-trifluoromethoxybenzene
10.0% of 4-[trans-4-(trans-4-pentylcyclohexyl)-cyclohexyl]-1-trifluoromethoxybenzene
12.0% of 4-(trans-4-propylcyclohexyl)-3',4',5'-trifluorobiphenyl
10.0% of 4-(trans-4-pentylcyclohexyl)-3', 4', 5'-trifluorobiphenyl
5.0% of 1-[trans-4-(trans-4-propylcyclohexyl)-cyclohexyl]-2-(4-trifluoromethoxyphenyl)-ethane
5.0% of 1-[trans-4-(trans-4-pentylcyclohexyl)-cyclohexyl]-2-(4-trifluoromethoxyphenyl)-ethane
3.0% of 4,4'-bis-(trans-4-propylcyclohexyl)-2-fluorobiphenyl
3.0% of 4,4'-bis-(trans-4-pentylcyclohexyl)-2-fluorobiphenyl
3.0% of 4-(trans-4-pentylcyclohexyl)-4'-(trans-4-propylcyclohexyl)-2-fluorobiphenyl The liquid crystal mixture exhibits the following physical parameters:

c.p.=98° C.
η=18 mPa.s
Δn=0.101
Δε=6.2

Example 2

A matrix liquid crystal display of the TFT type containing a nematic liquid crystal mixture consisting of
9.0% of 4-(trans-4-propylcyclohexyl)-1-chlorobenzene
8.0% of 4-(trans-4-pentylcyclohexyl)-1-chlorobenzene
6.0% of 4-(trans-4-heptylcyclohexyl)-1-chlorobenzene
10.0% of 4-[trans-4-(trans-4-ethylcyclohexyl)-cyclohexyl]-2-fluoro-1-difluoromethoxybenzene
14.0% of 4-[trans-4-(trans-4-propylcyclohexyl)-cyclohexyl]-2-fluoro-1-difluoromethoxybenzene
14.0% of 4-[trans-4-(trans-4-butylcyclohexyl)-cyclohexyl]-2-fluoro-1-difluoromethoxybenzene
12.0% of 4-(trans-4-propylcyclohexyl)-3'-fluoro-4'-difluoromethoxybiphenyl
10.0% of 4-(trans-4-pentylcyclohexyl)-3'-fluoro-4'-difluoromethoxybiphenyl
5.0% of 1-[trans-4-(trans-4-propylcyclohexyl)-cyclohexyl]-2-(4-trifluoromethoxyphenyl)-ethane
5.0% of 1-[trans-4-(trans-4-pentylcyclohexyl)-cyclohexyl]-2-(4-trifluoromethoxyphenyl)-ethane
3.0% of 4,4'-bis-(trans-4-propylcyclohexyl)-2-fluorobiphenyl
2.0% of 4,4'-bis-(trans-4-pentylcyclohexyl)-2-fluorobiphenyl
2.0% of 4-(trans-4-pentylcyclohexyl)-4'-(trans-4-propylcyclohexyl)-2-fluoro-biphenyl The liquid crystal mixture exhibits the following physical parameters:
c.p.=92° C.
η=22 mPa.s
Δε=5.5
Δn=0.105

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A matrix liquid-crystal display (MLCD) containing:
   two plane-parallel outer plates which are coated with alignment layers and, together with a frame, form a cell,
   integrated nonlinear elements for switching individual pixels on the outer places, and
   a nematic liquid-crystal mixture of positive dielectric anisotropy located in the cell,
wherein the liquid-crystal mixture is based on dielectrically positive liquid-crystal compounds which contain a polar end group of the formula I

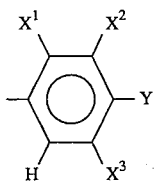

in which

Y is —NCS, —F, —Cl, —CZ$_l$H$_{3-l}$ or —OCZ$_l$H$_{3-l}$;

X$^1$, X$^2$ and X$^3$, independently of one another, are H or F;

Z is Cl or F; and l is 1, 2 or 3;

the lipophilicity parameter related to the end groups of formula I having a value $\bar{\pi} \geq 0.1$, said liquid crystal mixture comprising 35–59% by weight of compounds of the formula A2 and 5–45% by weight of compounds of the formula A3

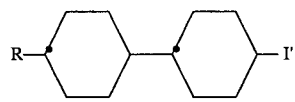

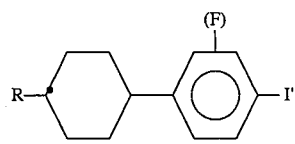

wherein

R is an alkyl group having 1–15 carbon atoms, in which, in addition, one or more non-adjacent CH$_2$ groups may be replaced by —O—, —CO—, —COO— or —CH=CH—;

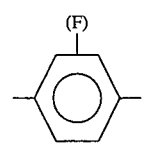

is unsubstituted 1,4-phenylene or 1,4-phenylene monosubstituted by F in the 2- or 3-position; and I' is a polar end group selected from the formulae Ia3 to Ia5 and I4 to I19

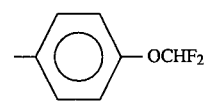

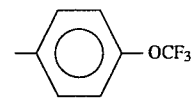

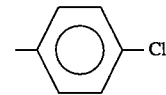

-continued

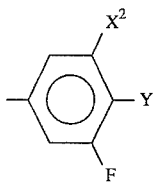
I4–I19 wherein
in formula I4, $X^2$ is F and Y is F;
in formula I5, $X^2$ is H and Y is Cl;
in formula I6, $X^2$ is F and Y is Cl;
in formula I7, $X^2$ is H and Y is $CF_3$;
in formula I8, $X^2$ is H and Y is $CFCl_2$;
in formula I9, $X^2$ is H and Y is $CCl_2H$;
in formula I10, $X^2$ is H and Y is $CCl_3$;
in formula I11, $X^2$ is F and Y is $CCl_3$;
in formula I12, $X^2$ is H and Y is $OCF_3$;
in formula I13, $X^2$ is F and Y is $OCF_3$;
in formula I14, $X^2$ is H and Y is $OCF_2Cl$;
in formula I15, $X^2$ is F and Y is $OCF_2Cl$;
in formula I16, $X^2$ is H and Y is $OCFCl_2$;
in formula I17, $X^2$ is F and Y is $OCFCl_2$;
in formula I18, $X^2$ is H and Y is $OCF_2H$; and
in formula I19, $X^2$ is F and Y is $OCF_2H$;
and wherein said liquid crystal mixture contains at least one compound of formula A

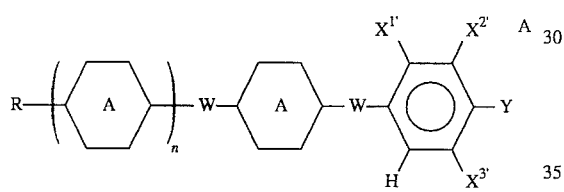
A wherein in formula A
Y is —NCS, —F, —Cl, $-CZ_lH_{3-l}$ or $-OCZ_lH_{3-l}$;
$X^{1'}$ is H or F;
$X^{2'}$ is F;
$X^{3'}$ is F;
Z is Cl or F;
l is 1, 2, or 3;
R is an alkyl group having 1–15 carbon atoms, wherein one or more non-adjacent $CH_2$ groups may be replaced by —O—, —CO—, —COO— or —CH=CH—;

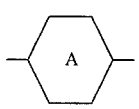

is in each case, independently of one another, 1,4-cyclohexylene, laterally unsubstituted or 5-mono and /or 2,3-di-F-substituted 1,4-phenylene, dioxane-2,5-diyl, or 1,4-cyclohexenylene;
W is a single bond or —$CH_2CH_2$—; and
n is 1 or 2.

2. A display according to claim 1, wherein said compound has a lipophilicity parameter π̄ value $\geq 0.3$.

3. A display according to claim 1, wherein said compound has a lipophilicity parameter π̄ value $\geq 0.5$.

4. A liquid crystal mixture comprising at least two components, wherein at least one of said components is a dielectrically positive liquid-crystal compound having a polar end group of the formula

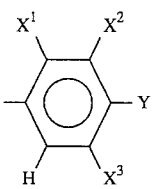
I in which
Y is —NCS, —F, —Cl, $-CZ_lH_{3-l}$ or $-OCZ_lH_{3-l}$;
$X^1$, $X^2$ and $X^3$, independently of one another, are H or F;
Z is Cl or F; and
l is 1, 2 or 3;
the lipophilicity parameter related to the end groups of formula I having a value π̄$\geq 0.1$, said liquid crystal mixture comprising 35–59% by weight of compounds of the formula A2 and 5–45% by weight of compounds of the formula A3

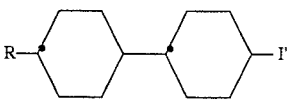
A2

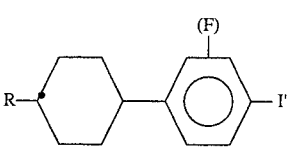
A3 wherein
R is an alkyl group having 1–15 carbon atoms, in which, in addition, one or more non-adjacent $CH_2$ groups may be replaced by —O—, —CO—, —COO— or —CH=CH—;

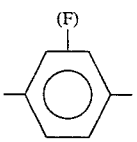

is unsubstituted 1,4-phenylene or 1,4-phenylene monosubstituted by F in the 2- or 3-position; and
I' is a polar end group selected from the formulae Ia3 to Ia5 and I4 to I19

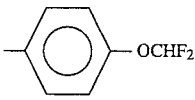
Ia3

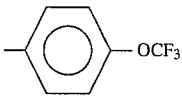
Ia4

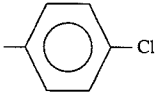
Ia5

-continued

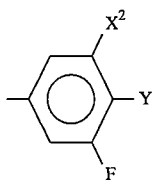
I4-I19 wherein,
in formula I4, $X^2$ is F and Y is F;
in formula I5, $X^2$ is H and Y is Cl;
in formula I6, $X^2$ is F and Y is Cl;
in formula I7, $X^2$ is H and Y is $CF_3$;
in formula I8, $X^2$ is H and Y is $CFCl_2$;
in formula I9, $X^2$ is H and Y is $CCl_2H$;
in formula I10, $X^2$ is H and Y is $CCl_3$;
in formula I11, $X^2$ is F and Y is $CCl_3$;
in formula I12, $X^2$ is H and Y is $OCF_3$;
in formula I13, $X^2$ is F and Y is $OCF_3$;
in formula I14, $X^2$ is H and Y is $OCF_2Cl$;
in formula I15, $X^2$ is F and Y is $OCF_2Cl$;
in formula I16, $X^2$ is H and Y is $OCFCL_2$;
in formula I17, $X^2$ is F and Y is $OCFCl_2$;
in formula I18, $X^2$ is H and Y is $OCF_2H$; and
in formula I19, $X^2$ is F and Y is $OCF_2H$;
and wherein said liquid crystal mixture contains at least one compound of formula A

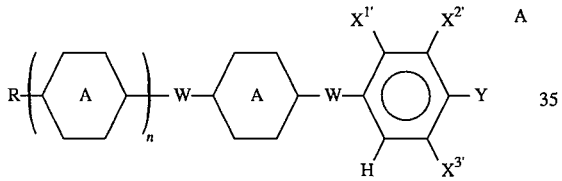

wherein in formula A

Y is —NCS, —F, —Cl, —$CZ_lH_{3-l}$ or —$OCZ_lH_{3-l}$;
$X^{1'}$ is H or F;
$X^{2'}$ is F;
$X^{3'}$ is F;
Z is Cl or F;
l is 1, 2, or 3;
R is an alkyl group having 1–15 carbon atoms, wherein one or more non-adjacent $CH_2$ groups may be replaced by —O—, —CO—, —COO— or —CH=CH—;

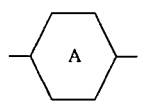

is in each case, independently of one another, 1,4-cyclohexylene, laterally unsubstituted or 5-mono and/or 2,3-di-F-substituted 1,4-phenylene, dioxane-2,5-diyl, or 1,4-cyclohexenylene;
W is a single bond or —$CH_2CH_2$—; and
n is 1 or 2.

* * * * *